(12) United States Patent
Miyamoto

(10) Patent No.: US 11,325,497 B2
(45) Date of Patent: May 10, 2022

(54) VEHICLE ELECTRICITY SUPPLY CONTROL SYSTEM

(71) Applicant: TOYOTA JIDOSHA KABUSHIKI KAISHA, Toyota (JP)

(72) Inventor: Yuma Miyamoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 22 days.

(21) Appl. No.: 17/003,090

(22) Filed: Aug. 26, 2020

(65) Prior Publication Data

US 2021/0107374 A1 Apr. 15, 2021

(30) Foreign Application Priority Data

Oct. 11, 2019 (JP) .............................. JP2019-188017

(51) Int. Cl.
*B60L 58/13* (2019.01)
*B60K 16/00* (2020.01)
*B60L 50/60* (2019.01)
*B60L 1/00* (2006.01)

(52) U.S. Cl.
CPC .............. *B60L 58/13* (2019.02); *B60K 16/00* (2013.01); *B60L 50/60* (2019.02); *B60K 2016/003* (2013.01); *B60L 1/00* (2013.01)

(58) Field of Classification Search
CPC ....................................................... B60L 58/13
USPC ......................................................... 320/166
See application file for complete search history.

(56) References Cited

U.S. PATENT DOCUMENTS

| | | | |
|---|---|---|---|
| 2009/0001926 A1* | 1/2009 | Sato | B60L 3/003 320/102 |
| 2013/0320911 A1* | 12/2013 | Kamiya | B60L 53/22 320/101 |
| 2015/0349582 A1* | 12/2015 | Maeno | B60L 3/0046 320/101 |
| 2016/0089986 A1* | 3/2016 | Maeno | B60L 50/40 320/101 |
| 2018/0043788 A1* | 2/2018 | Kuribara | B60L 8/003 |
| 2018/0099577 A1* | 4/2018 | Nagata | H02J 7/0091 |
| 2018/0105042 A1* | 4/2018 | Kuribara | B60L 53/51 |
| 2018/0154778 A1* | 6/2018 | Ota | H02J 7/0068 |
| 2018/0201150 A1* | 7/2018 | Kubo | B60L 8/003 |
| 2018/0297476 A1* | 10/2018 | Malek | H02J 7/35 |

FOREIGN PATENT DOCUMENTS

| JP | 2014-007937 A | 1/2014 |
|---|---|---|
| JP | 2020-048286 A | 3/2020 |

* cited by examiner

*Primary Examiner* — Jerry D Robbins
(74) *Attorney, Agent, or Firm* — Oliff PLC

(57) ABSTRACT

A vehicle electricity supply control system, including: an acquisition section configured to acquire a power consumption of an auxiliary system, the auxiliary system being supplied with electricity from an auxiliary battery; and a control section configured to, in a first supply mode in which electricity is supplied to a drive battery and the auxiliary system and in a case in which the power consumption of the auxiliary system is greater than a predetermined value, control a ratio of electricity supplied to the drive battery and the auxiliary system such that an electricity supply amount to the auxiliary system becomes greater than in a case in which the power consumption of the auxiliary system is less than the predetermined value.

6 Claims, 13 Drawing Sheets

FIG.14

| AGE | HUMIDITY | TEMPERATURE | POWER CONSUMPTION |
|---|---|---|---|
| ~Y1 | ~H1 | ~25°C | 10W |
| | | 25°C~30°C | 11W |
| | | 40°C~ | 12W |
| | H1~H2 | ~25°C | 11W |
| | | 25°C~30°C | 12W |
| | | 40°C~ | 13W |
| : | : | : | : |

66

VEHICLE ELECTRICITY SUPPLY CONTROL SYSTEM

CROSS-REFERENCE TO RELATED APPLICATION

This application claims priority under 35 USC 119 from Japanese Patent Application No. 2019-188017, filed on Oct. 11, 2019, the disclosure of which is incorporated by reference herein.

BACKGROUND

Technical Field

The present disclosure relates to a vehicle electricity supply control system.

Related Art

Japanese Patent Application Laid-Open (JP-A) No. 2014-007937 discloses a technology that temporarily charges an auxiliary battery with electric power generated by a solar panel, and in a case in which charged electric power of the auxiliary battery reaches at least a prescribed amount, boosts a terminal voltage of the auxiliary battery with a boost circuit and charges a main battery.

However, the technology recited in JP-A No. 2014-007937 charges the auxiliary battery without taking account of power consumption by auxiliary systems that are supplied with electric power by the auxiliary battery. Therefore, there may be divergence between electricity supply power and power consumption of the auxiliary systems, for example, as illustrated in FIG. 15, and there is a risk that the auxiliary battery may become overcharged or running out of battery.

SUMMARY

The present disclosure provides a vehicle electricity supply control system that may suppress overcharging or running out of an auxiliary battery.

A first aspect of the present disclosure is a vehicle electricity supply control system, including: an acquisition section configured to acquire a power consumption of an auxiliary system, the auxiliary system being supplied with electricity from an auxiliary battery; and a control section configured to, in a first supply mode in which electricity is supplied to a drive battery and the auxiliary system and in a case in which the power consumption of the auxiliary system is greater than a predetermined value, control a ratio of electricity supplied to the drive battery and the auxiliary system such that an electricity supply amount to the auxiliary system becomes greater than in a case in which the power consumption of the auxiliary system is less than the predetermined value.

In the first aspect of the present disclosure, in the first supply mode, electricity supply amounts to the auxiliary system that is supplied with power from the auxiliary battery are changed in accordance with power consumption by the auxiliary system. Therefore, overcharging of the auxiliary battery in a case in which the power consumption of the auxiliary system is small, may be suppressed and the drive battery may be charged efficiently. In addition, running out of the auxiliary battery in a case in which the power consumption of the auxiliary system is large may be suppressed. Thus, the first aspect of the present disclosure may suppress overcharging or running out of the auxiliary battery.

In a second aspect of the present disclosure, in the above first aspect, in the first supply mode, the supply of electricity to the drive battery and the auxiliary system may use electricity generated by a solar panel.

According to the second aspect of the present disclosure, electricity generated by the solar panel may be utilized effectively in supplying electricity to the drive battery and the auxiliary battery.

In a third aspect of the present disclosure, in the above second aspect, in a second supply mode, electricity generated by the solar panel may be supplied to a solar battery, and in the first supply mode, electricity may be supplied from the solar battery to the drive battery and the auxiliary system.

According to the third aspect of the present disclosure, the electricity generated by the solar panel is temporarily supplied to the solar battery; subsequently, electricity is supplied from the solar battery to the drive battery and the auxiliary battery. Thus, electricity supplies to the drive battery and the auxiliary battery in the first supply mode may be stabilized.

In a fourth aspect of the present disclosure, in the above aspects, the acquisition section may estimate the power consumption of the auxiliary system on the basis of at least one of a temperature, a humidity and an age of the auxiliary system.

The power consumption of the auxiliary system may be calculated from various parameters such as, for example, electricity supply power to the auxiliary system and input/output current and voltage of the auxiliary battery. However, according to the fourth aspect of the present disclosure, the power consumption of the auxiliary system may be acquired by estimation even in a configuration that does not detect these parameters.

In a fifth aspect of the present disclosure, in the above aspects, in a case in which a voltage of the auxiliary battery is not higher than an upper limit threshold $\alpha$ and not lower than a lower limit threshold $\beta$, the control section may cause electricity supplied to the auxiliary system to be the power consumed by the auxiliary system.

According to the fifth aspect of the present disclosure, in a case in which the voltage of the auxiliary battery is at most the upper limit threshold $\alpha$ and at least the lower limit threshold $\beta$, the control section supplies electricity to the auxiliary system in accordance with the power consumption of the auxiliary system. Thus, a state of charge of the auxiliary battery may be maintained.

In a sixth aspect of the present disclosure, in the above aspects, in a case in which a voltage of the auxiliary battery is higher than an upper limit threshold $\alpha$, the control section may cause electricity to be supplied to the auxiliary system in an amount that is the power consumed by the auxiliary system minus a predetermined value X.

According to the sixth aspect of the present disclosure, in a case in which the voltage of the auxiliary battery is higher than the upper limit threshold $\alpha$, the electricity supply to the auxiliary system is controlled so as to discharge the auxiliary battery. Thus, overcharging of the auxiliary battery may be suppressed.

In a seventh aspect of the present disclosure, in the above aspects, in a case in which a voltage of the auxiliary battery is lower than a lower limit threshold $\beta$, the control section may cause electricity to be supplied to the auxiliary system in an amount that is the power consumed by the auxiliary system plus a predetermined value Y.

According to the seventh aspect of the present disclosure, in a case in which the voltage of the auxiliary battery is lower than the lower limit threshold β, the electricity supply to the auxiliary system is controlled so as to charge the auxiliary battery. Thus, running out of the auxiliary battery may be suppressed.

According to the aspects described above, the vehicle electricity supply control system of the present disclosure may suppress overcharging or running out of an auxiliary battery.

BRIEF DESCRIPTION OF THE DRAWINGS

Exemplary embodiments will be described in detail based on the following figures, wherein:

FIG. 14 is a table illustrating an example of a map according to a fourth exemplary embodiment.

DETAILED DESCRIPTION

Herebelow, an example of an exemplary embodiment of the present disclosure is described in detail with reference to the attached drawings.

First Exemplary Embodiment

Figure 1:
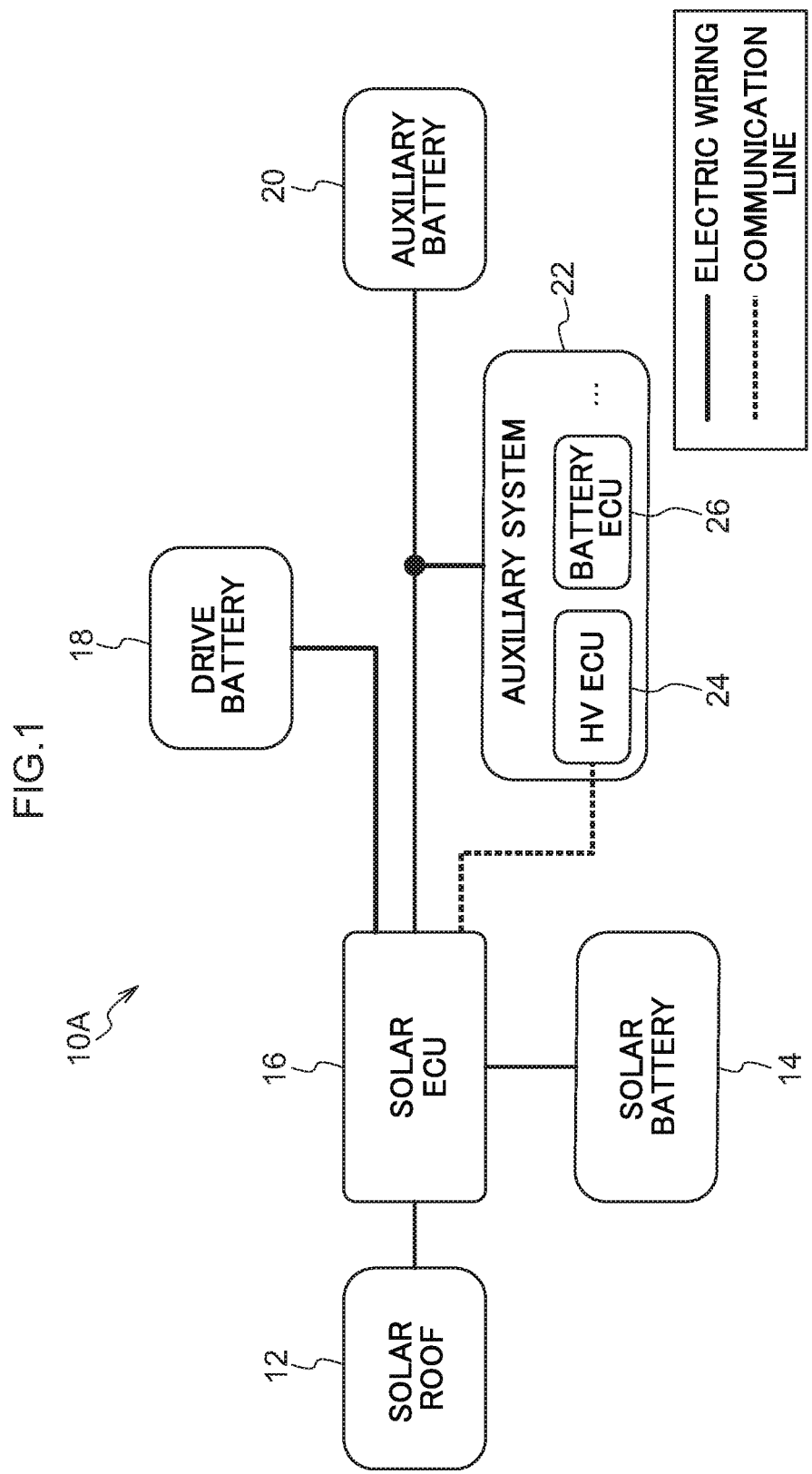
FIG. 1 is a block diagram illustrating schematic configurations of a vehicle electricity supply control system according to a first exemplary embodiment.

As illustrated in FIG. 1, an electricity supply system for a vehicle 10A according to the first exemplary embodiment is installed in a vehicle. The electricity supply system for a vehicle 10A includes a solar roof 12, a solar battery 14, a solar electronic control unit (ECU) 16, a drive battery 18, an auxiliary battery 20, and an auxiliary system 22. The solar roof 12, the solar battery 14, the drive battery 18 and the auxiliary battery 20 are connected to the solar ECU 16 via electric wiring. The auxiliary system 22 is connected partway along the electric wiring that connects the solar ECU 16 with the auxiliary battery 20. The vehicle is, as an example, a hybrid vehicle (HV) but may be an electric vehicle (EV).

The solar roof 12 is disposed at a roof of the vehicle and generates electricity from sunlight. The solar roof 12 is an example of a solar panel. The solar battery 14 temporarily accumulates the electricity generated by the solar roof 12.

Figure 2:
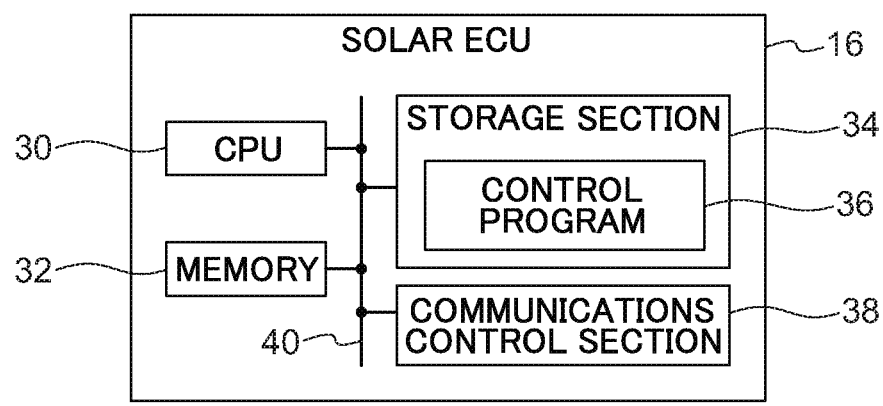
FIG. 2 is a block diagram illustrating schematic configurations of a solar ECU.

As illustrated in FIG. 2, the solar ECU 16 includes a central processing unit (CPU) 30, a memory 32 with read-only memory (ROM) and random access memory (RAM) or the like, a non-volatile storage section 34 with a hard disk drive (HDD), solid state drive (SSD) or the like, and a communications control section 38. The CPU 30, memory 32, storage section 34 and communications control section 38 are connected to be capable of communicating with one another via an internal bus 40.

Figure 3:
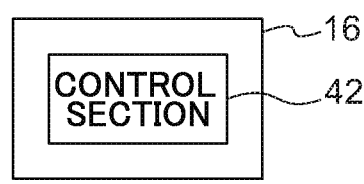
FIG. 3 is a functional block diagram of the solar ECU.

A control program 36 is stored in the storage section 34. The solar ECU 16 reads the control program 36 from the storage section 34 and loads the control program 36 into the memory 32. The control program 36 loaded into the memory 32 is executed by the CPU 30. Thus, the solar ECU 16 functions as a control section 42 illustrated in FIG. 3.

In a second supply mode for supplying electricity to the solar battery 14, the control section 42 supplies the solar battery 14 with electricity generated by the solar roof 12. In a first supply mode for supplying electricity to the drive battery 18 and the auxiliary system 22 from the solar battery 14, the control section 42 controls a ratio of electricity supplied to the drive battery 18 and the auxiliary system 22 such that an electricity supply amount to the auxiliary system 22 is larger in a case in which power consumption of the auxiliary system 22 is at least a predetermined value than in a case in which power consumption of the auxiliary system 22 is less than the predetermined value.

The drive battery 18 is connected to a power control unit (below, "the PCU"), which is not illustrated in the drawings, and the PCU is connected to a motor-generator (below, "the MG"), which is not illustrated in the drawings. The PCU includes an inverter that is capable of converting AC electricity to DC electricity and converting DC electricity to AC electricity. The motor-generator operates as a motor that causes running of the vehicle and operates as a generator. In a case in which the motor-generator operates as the motor, electricity is supplied from the drive battery 18 through the PCU to the motor-generator. In a case in which the motor-generator operates as the generator, electricity generated by the motor-generator is supplied through the PCU to the drive battery 18 and charges the drive battery 18.

The auxiliary battery 20 supplies electricity to the auxiliary system 22. The auxiliary system 22 includes plural electric power loads. In FIG. 1, an HV ECU 24 and a battery ECU 26 are illustrated as examples of the plural electric power loads included in the auxiliary system 22. The HV ECU 24 is connected with the solar ECU 16 via a communication line.

Figure 4:
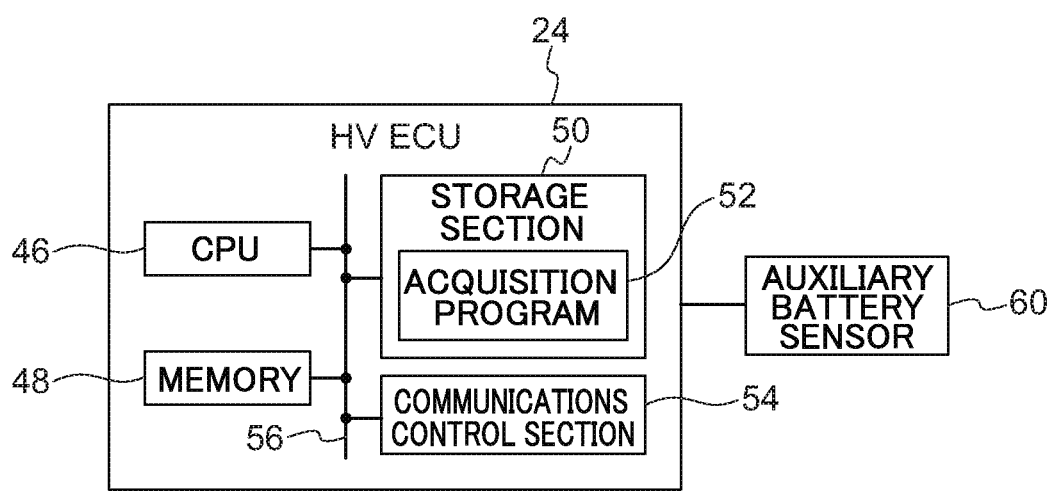
FIG. 4 is a block diagram illustrating schematic configurations of an HV (hybrid vehicle) ECU.

As illustrated in FIG. 4, the HV ECU 24 includes a CPU 46, a memory 48 with ROM and RAM or the like, a non-volatile storage section 50 with an HDD, an SSD or the like, and a communications control section 54. The CPU 46, memory 48, storage section 50 and communications control section 54 are connected to be capable of communicating with one another via an internal bus 56. The HV ECU 24 is connected to an auxiliary battery sensor 60 that detects input/output current and voltage of the auxiliary battery 20.

Figure 5:
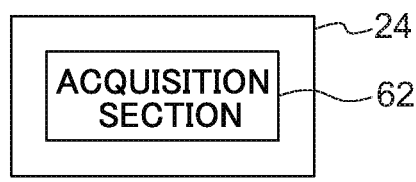
FIG. 5 is a functional block diagram of the HV ECU.

An acquisition program 52 is stored in the storage section 50. The HV ECU 24 reads the acquisition program 52 from the storage section 50 and loads the acquisition program 52 into the memory 48. The acquisition program 52 loaded into the memory 48 is executed by the CPU 46. Thus, the HV ECU 24 functions as an acquisition section 62 illustrated in FIG. 5. The acquisition section 62 acquires power consumption of the auxiliary system 22.

The solar ECU 16 and HV ECU 24 function as an example of the vehicle electricity supply control system.

Now, as operation of the first exemplary embodiment, electricity supply control processing that is performed by the solar ECU 16 and HV ECU 24 in cooperation is described with reference to FIG. 6.

Figure 7:
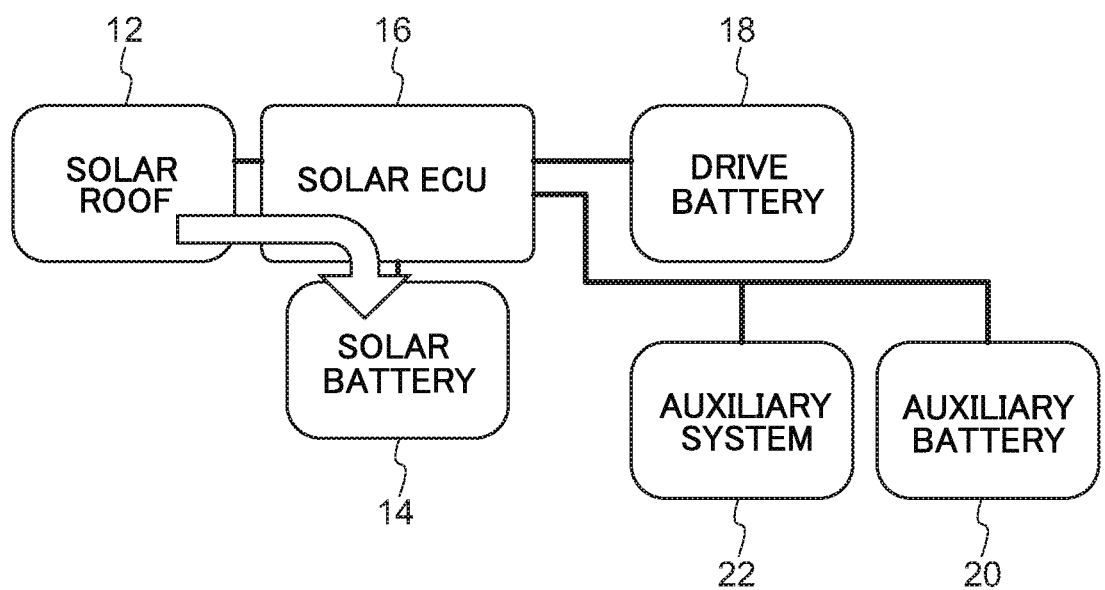
FIG. 7 is a schematic diagram illustrating flows of electricity in a second supply mode.

In step 100, the control section 42 of the solar ECU 16 makes a determination as to whether a state of charge (SOC) of the solar battery 14 is below a charging completion threshold A of the drive battery 18. In a case in which the result of the determination in step 100 is affirmative, the control section 42 proceeds to step 118. In step 118, the control section 42 ends charging of the drive battery 18 and the like from the solar battery 14, switches into the second supply mode, and charges the solar battery 14 with electricity generated by the solar roof 12 (see FIG. 7).

Figure 8:
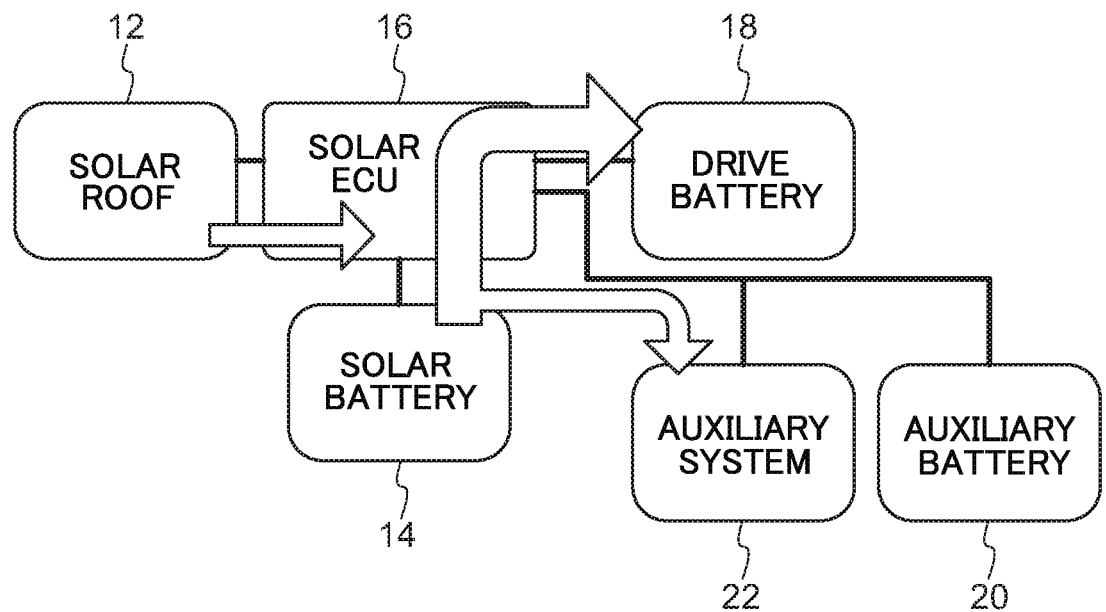
FIG. 8 is a schematic diagram illustrating flows of electricity in a first supply mode.

In a case in which the result of the determination in step 100 is negative, the control section 42 proceeds to step 102. From step 102 onward, the control section 42 implements the first supply mode, in which the electricity accumulated in the solar battery 14 (and electricity generated by the solar roof 12) is supplied to the auxiliary system 22 and the drive battery 18 (see FIG. 8).

That is, in step 102, the acquisition section 62 of the HV ECU 24 acquires from the solar ECU 16 the power of electricity supply from the solar ECU 16 to the auxiliary system 22, and acquires from the auxiliary battery sensor 60 detected values of input/output current and voltage of the auxiliary battery 20.

Figure 9:
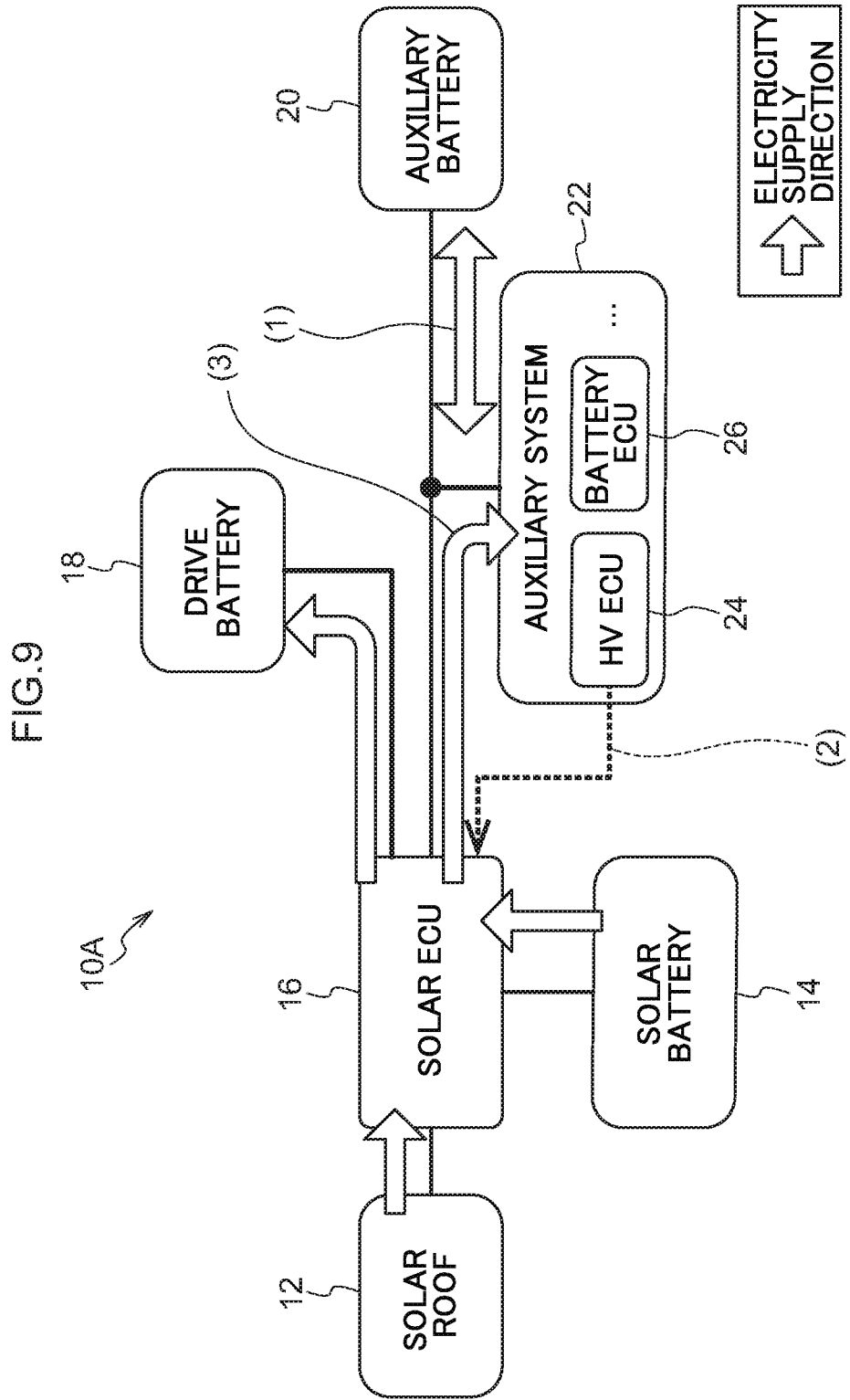
FIG. 9 is a conceptual diagram illustrating an outline of the electricity supply control processing.

Then, in step 104, the acquisition section 62 calculates an actual power consumption W2 of the auxiliary system 22 in accordance with the following expression (1), on the basis of the electricity supply power W1 from the solar ECU 16 to the auxiliary system 22 that is acquired in step 102 and the input/output current and voltage of the auxiliary battery 20 (see (1) in FIG. 9).

$$W2 = W1 + I \cdot V \quad (1)$$

Note that the sign of the input/output current I is positive for current in the direction from the auxiliary battery 20 to the auxiliary system 22.

In step 106, the acquisition section 62 feeds back to the solar ECU 16 the actual power consumption W2 of the auxiliary system 22 and the voltage V of the auxiliary battery 20 (see (2) in FIG. 9).

In step 112, the control section 42 supplies the electricity accumulated in the solar battery 14 from the solar ECU 16 to the drive battery 18 and the auxiliary system 22 (and the auxiliary battery 20) in time divisions. In periods when the auxiliary system 22 is being supplied with electricity, the control section 42 controls the electricity supply power to the auxiliary system 22 to match the power consumption of the auxiliary system 22 fed back from the HV ECU 24 (see (3) in FIG. 9). Thus, the control section 42 controls a ratio of electricity supplied to the drive battery 18 and the auxiliary system 22.

Figure 10:
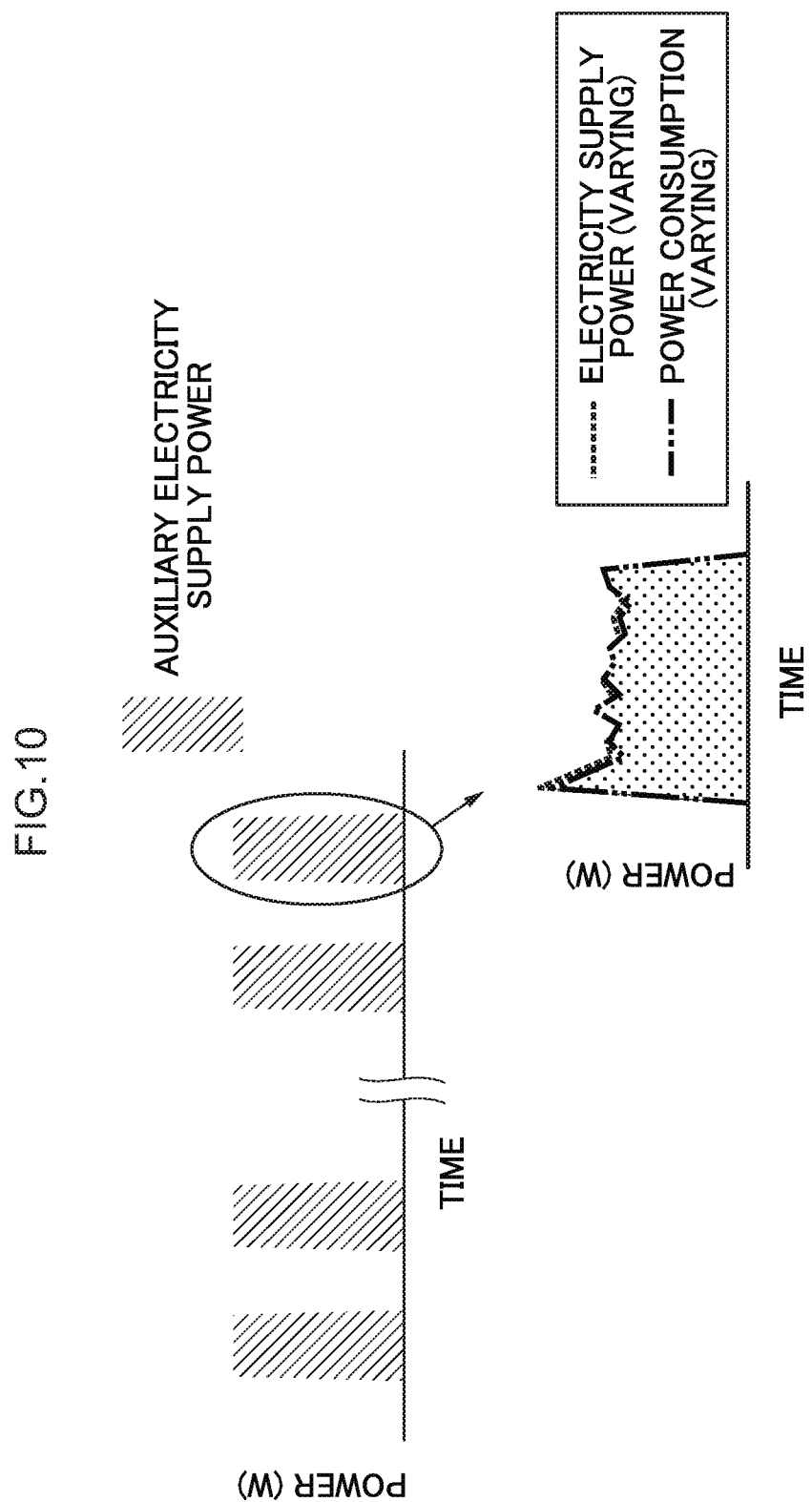
FIG. 10 is a conceptual diagram for describing control of electricity supply power in accordance with power consumption.

In a case in which the processing of step 112 has been executed, the control section 42 returns to step 100. As illustrated by the example in FIG. 10, the electricity supply power to the auxiliary system 22 is changed in accordance with changes in the power consumption of the auxiliary system 22 by the processing of step 112. That is, the ratio of electricity supplied to the drive battery 18 and the auxiliary system 22 are controlled such that amounts of electricity supplied to the auxiliary system 22 are larger in a case in which the power consumption of the auxiliary system 22 is at least the predetermined value than in a case in which the power consumption of the auxiliary system 22 is below the predetermined value.

Thus, unnecessary supplies of electricity to the auxiliary system 22 (and the auxiliary battery 20) may be reduced. Therefore, charging amounts of the drive battery 18 may be improved, unnecessary charging of the auxiliary battery 20 may be abated, and running out of the auxiliary battery 20 may be suppressed. Moreover, because the electricity supply power is changed in accordance with the voltage of the auxiliary battery 20, the voltage of the auxiliary battery 20 may be regulated to an arbitrary value.

In the first supply mode, the electricity generated by the solar roof 12 is used and supplied to the drive battery 18 and the auxiliary system 22. Thus, the electricity generated by the solar roof 12 may be utilized effectively in supplying electricity to the drive battery 18 and the auxiliary system 22. In addition, electricity generated by the solar roof 12 is temporarily supplied to the solar battery 14, and subsequently electricity is supplied from the solar battery 14 to the drive battery 18 and the auxiliary system 22. Therefore, in the first supply mode, electricity supplies to the drive battery 18 and the auxiliary system 22 may be stabilized.

Second Exemplary Embodiment

Now, a second exemplary embodiment of the present disclosure is described. Configurations of the second exemplary embodiment are the same as in the first exemplary embodiment. Therefore, the same reference symbols are assigned to the respective sections and descriptions of the configurations are not given. Below, with reference to FIG. 11, portions of electricity supply control processing according to the second exemplary embodiment that differ from the first exemplary embodiment are described.

In the electricity supply control processing according to the second exemplary embodiment, in a case in which the processing of step 106 has been executed, the control section 42 proceeds to step 108. In step 108, the control section 42 makes a determination as to whether the voltage V of the auxiliary battery 20 is below a predetermined auxiliary battery voltage upper limit threshold α. In a case in which the result of the determination in step 108 is affirmative, the control section 42 proceeds to step 110. In step 110, the control section 42 makes a determination as to whether the voltage V of the auxiliary battery 20 is above a predetermined auxiliary battery voltage lower limit threshold β. In a case in which the result of the determination in step 110 is affirmative, the control section 42 proceeds to step 112.

In step 112, the control section 42 supplies the electricity accumulated in the solar battery 14 from the solar ECU 16 to the drive battery 18 and the auxiliary system 22 (and the auxiliary battery 20) in time divisions. In periods when the auxiliary system 22 is being supplied with electricity, the control section 42 controls the electricity supply power to the auxiliary system 22 to match the power consumption of the auxiliary system 22 fed back from the HV ECU 24 (see note (3) in FIG. 9). Thus, the control section 42 controls the ratio of electricity supplied to the drive battery 18 and the auxiliary system 22.

Alternatively, in a case in which the result of the determination in step 110 is negative, the control section 42 proceeds to step 114. In step 114, the control section 42 supplies the electricity accumulated in the solar battery 14 from the solar ECU 16 to the drive battery 18 and the auxiliary system 22 (and the auxiliary battery 20) in time divisions. In periods when the auxiliary system 22 is being supplied with electricity, the control section 42 controls the electricity supply power to the auxiliary system 22 to match a value that is the power consumption of the auxiliary system 22 fed back from the HV ECU 24 plus a fixed constant Y (see note (3) in FIG. 9). Thus, the control section 42 controls the ratio of electricity supplied to the drive battery 18 and the auxiliary system 22. This fixed constant Y is an example of a predetermined value Y.

Further, in a case in which the result of the determination in step 108 is negative, the control section 42 proceeds to step 116. In step 116, the control section 42 supplies the electricity accumulated in the solar battery 14 from the solar ECU 16 to the drive battery 18 and the auxiliary system 22 (and the auxiliary battery 20) in time divisions. In periods when the auxiliary system 22 is being supplied with electricity, the control section 42 controls the electricity supply power to the auxiliary system 22 to match a value that is the power consumption of the auxiliary system 22 fed back from the HV ECU 24 minus a fixed constant X (see note (3) in FIG. 9). Thus, the control section 42 controls the ratio of electricity supplied to the drive battery 18 and the auxiliary system 22. This fixed constant X is an example of a predetermined value X.

In a case in which the processing of any of steps 112 to 116 described above has been executed, the control section 42 returns to step 100. As illustrated by the example in FIG. 10, the electricity supply power to the auxiliary system 22 is changed in accordance with changes in the power consumption of the auxiliary system 22 by the processing of any of steps 112 to 116. That is, the ratio of electricity supplied to the drive battery 18 and the auxiliary system 22 are controlled such that amounts of electricity supplied to the auxiliary system 22 are larger in a case in which the power consumption of the auxiliary system 22 is at least the predetermined value than in a case in which the power consumption of the auxiliary system 22 is below the predetermined value.

Thus, unnecessary supplies of electricity to the auxiliary system 22 (and the auxiliary battery 20) may be reduced. Therefore, charging amounts of the drive battery 18 may be improved, unnecessary charging of the auxiliary battery 20 may be abated, and running out of the auxiliary battery 20 may be suppressed. Moreover, because the electricity supply power is changed in accordance with the voltage of the auxiliary battery 20, the voltage of the auxiliary battery 20 may be regulated to an arbitrary value.

In a case in which the voltage of the auxiliary battery 20 is at most the predetermined auxiliary battery upper limit threshold α and at least the predetermined auxiliary battery lower limit threshold β, the electricity supply power to the auxiliary system 22 is controlled in step 112 so as to match the power consumption of the auxiliary system 22. Thus, the state of charge of the auxiliary battery may be maintained.

In a case in which the voltage of the auxiliary battery 20 is lower than the predetermined auxiliary battery lower limit threshold β, the electricity supply power to the auxiliary system 22 is controlled in step 114 so as to match a value that is the power consumption of the auxiliary system 22 plus the fixed constant Y. Thus, the control section 42 controls the electricity supply to the auxiliary system 22 so as to charge the auxiliary battery 20, and running out of the auxiliary battery 20 may be suppressed.

In a case in which the voltage of the auxiliary battery 20 is higher than the predetermined auxiliary battery upper limit threshold a, the electricity supply power to the auxiliary system 22 is controlled in step 116 so as to match a value that is the power consumption of the auxiliary system 22 minus the fixed constant X. Thus, the control section 42 controls the electricity supply to the auxiliary system 22 so as to discharge the auxiliary battery 20, and overcharging of the auxiliary battery 20 may be suppressed.

Third Exemplary Embodiment

Now, a third exemplary embodiment of the present disclosure is described. Portions that are the same as in the first exemplary embodiment are assigned the same reference symbols and are not described here.

Figure 12:
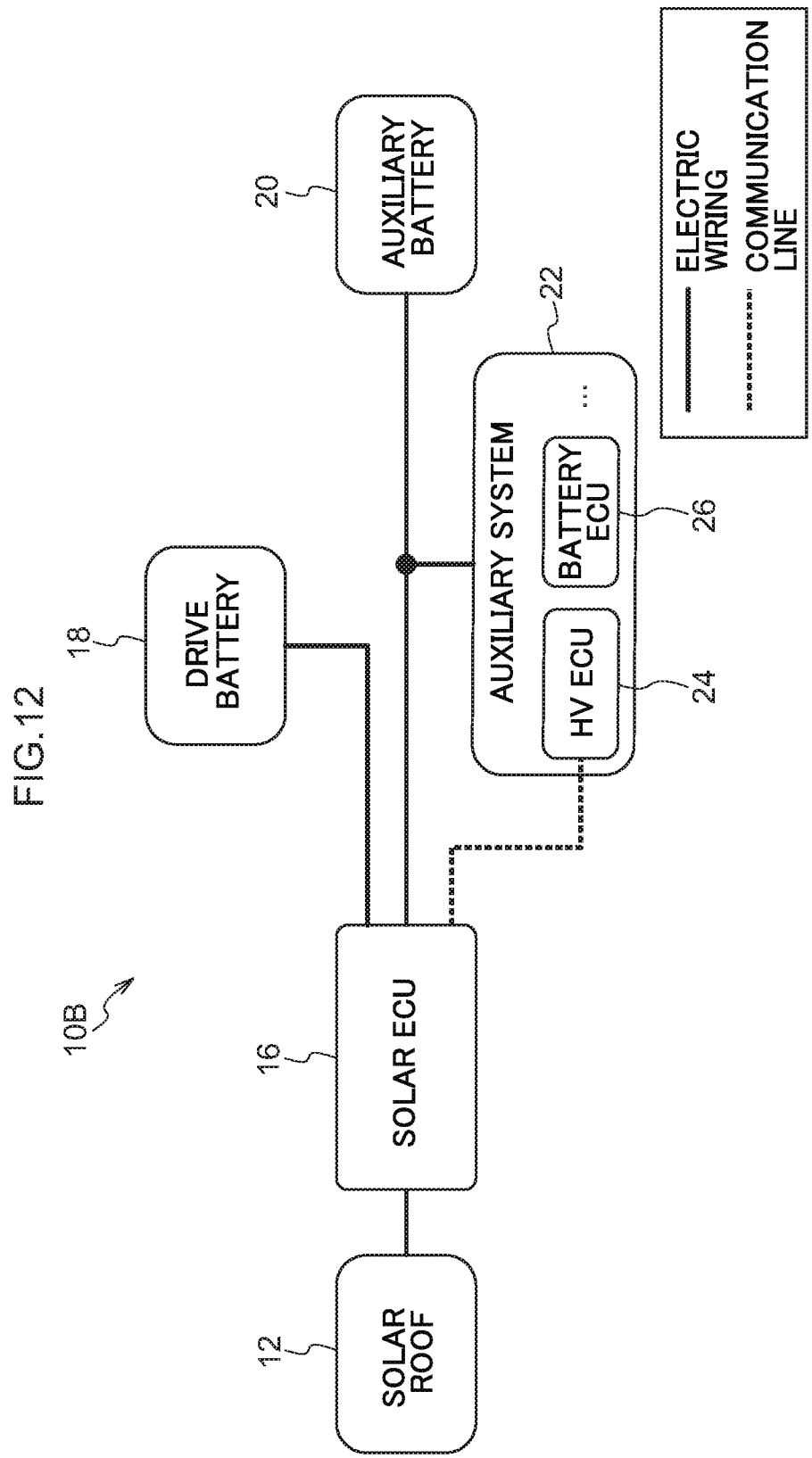
FIG. 12 is a block diagram illustrating schematic configurations of a vehicle electricity supply control system according to a third exemplary embodiment.

As illustrated in FIG. 12, an electricity supply system for a vehicle 10B according to the third exemplary embodiment differs from the electricity supply system for a vehicle 10A described in the first exemplary embodiment in that the solar battery 14 is omitted. Therefore, in the third exemplary embodiment, the second supply mode is not provided. In the first supply mode, electricity generated by the solar roof 12 is supplied directly from the solar roof 12 to the drive battery 18 and the auxiliary system 22.

Figure 13:
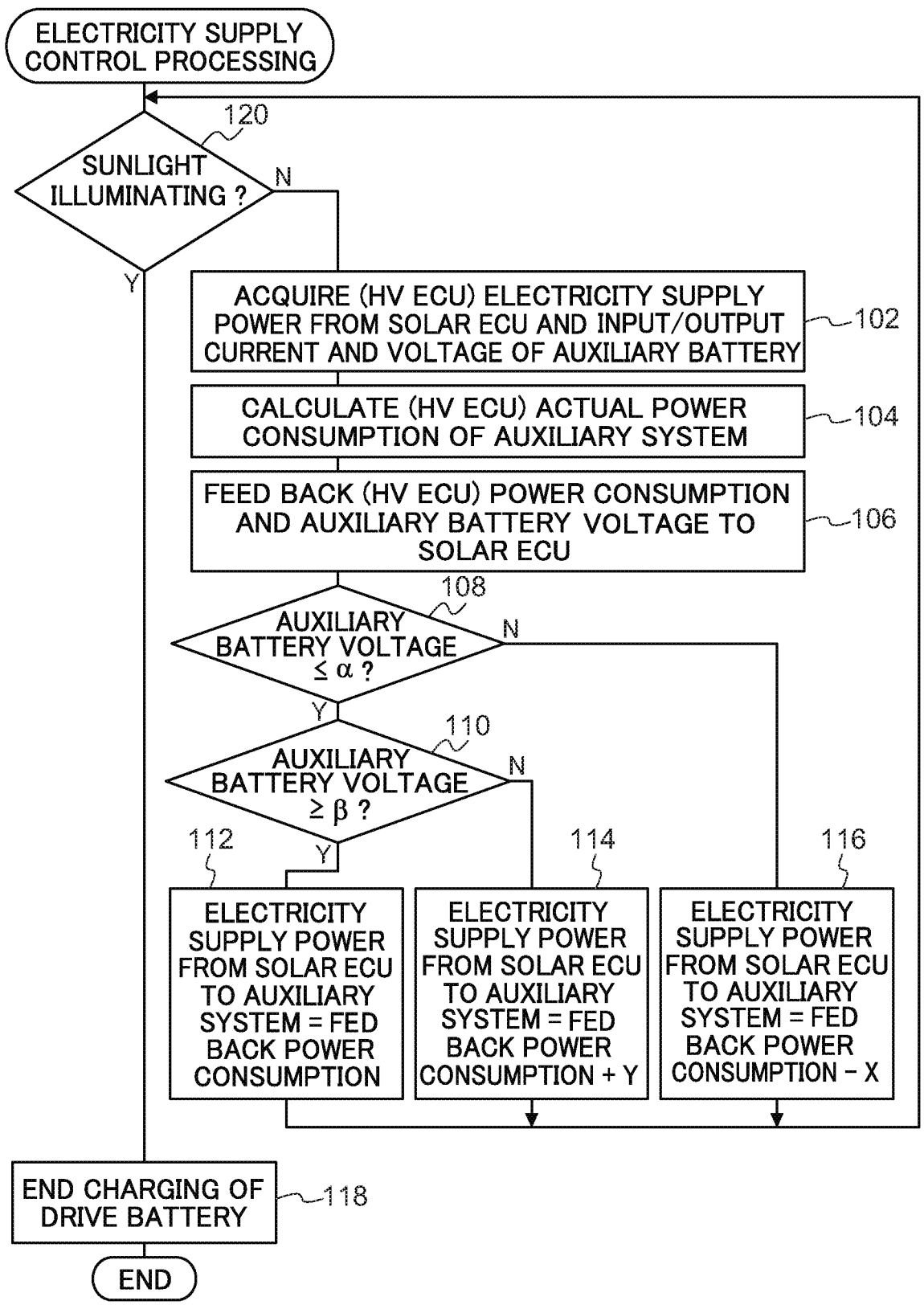
FIG. 13 is a flowchart illustrating electricity supply control processing according to the third exemplary embodiment.
Figure 15:
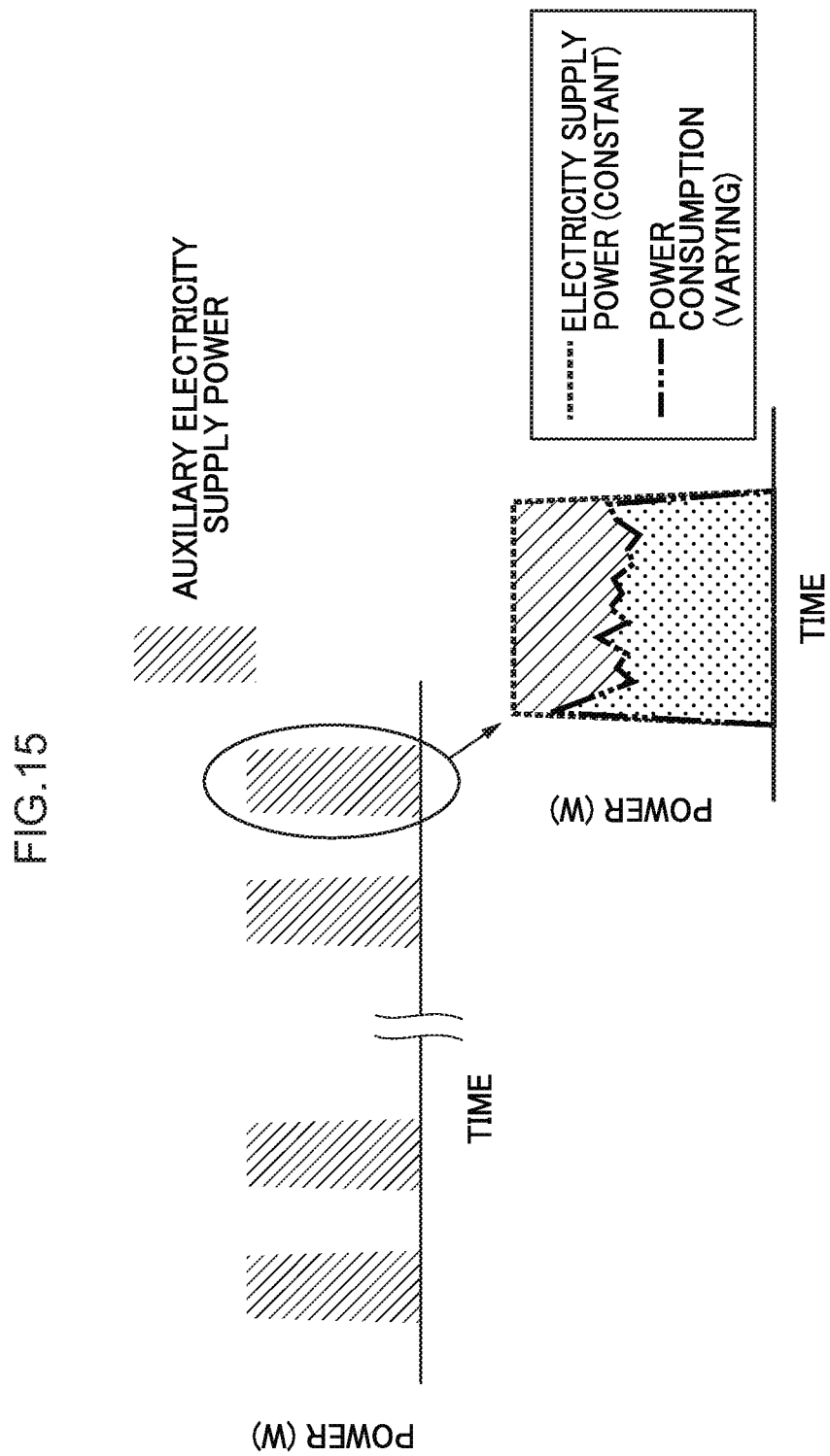
FIG. 15 is a conceptual diagram for describing a situation with a conventional technology in which there is divergence between electricity supply power and power consumption.

As illustrated in FIG. 13, in the electricity supply control processing according to the third exemplary embodiment, step 120 replaces step 100. In step 120, a determination is made as to whether sunlight is illuminating. In a case in which the result of the determination in step 120 is negative, the control section 42 proceeds to step 118 and ends the supply of electricity from the solar roof 12 to the drive battery 18 and the like. In a case in which the result of the determination in step 120 is affirmative, the control section 42 proceeds to step 102 and implements the first supply mode in which electricity generated by the solar roof 12 is supplied to the drive battery 18 and the auxiliary system 22.

Thus, in the third exemplary embodiment, configurations of the electricity supply system for a vehicle 10B may be simplified by the omission of the solar battery 14.

Fourth Exemplary Embodiment

Now, a fourth exemplary embodiment of the present disclosure is described. Portions that are the same as in the first exemplary embodiment are assigned the same reference symbols and are not described here.

In the first to third exemplary embodiments described above, situations are described in which the actual power consumption of the auxiliary system 22 is calculated on the basis of the electricity supply power from the solar ECU 16 to the auxiliary system 22 and the input/output current and voltage of the auxiliary battery 20. By contrast, in the fourth exemplary embodiment, the power consumption of the auxiliary system 22 is estimated.

In the fourth exemplary embodiment, a map 66 of power consumption as illustrated in FIG. 14 is created for each of the plural electric power loads included in the auxiliary system 22. FIG. 14 illustrates the map 66 of power consumption of the battery ECU 26 as an example of an electric power load. The map 66 specifies power consumptions of the battery ECU 26 for respective values of the parameters temperature, humidity and age. The power consumptions specified in the map 66 for the respective values of the parameters are found by, for example, experimentation or the like.

In a case in which the power consumption of the auxiliary system 22 is to be estimated, first, electric power loads that are operating among the electric power loads included in the auxiliary system 22 are identified. Then, for the electric power loads that are identified as operating, the respective maps 66 of power consumption are read, and the respective power consumptions corresponding to values of the parameters temperature, humidity and age are acquired from the maps 66. A total of the power consumptions acquired from the maps 66 for the operating electric power loads in the auxiliary system 22 is calculated to be used as the estimate of the power consumption of the auxiliary system 22.

Thus, in the fourth exemplary embodiment, even in a configuration in which parameters such as the electricity supply power to the auxiliary system 22 and the input/output current and voltage of the auxiliary system 22 are not detected, the power consumption of the auxiliary system may be acquired by estimation. Thus, for example, a number of sensors may be reduced.

In the fourth exemplary embodiment, a situation is described in which a power consumption corresponding to values of the parameters temperature, humidity and age is estimated (acquired from the map 66) to serve as the power consumption of an operating electric power load. However, this is not limiting. The corresponding power consumption may be estimated on the basis of any one of the parameters temperature, humidity and age, or on the basis of two parameters selected from temperature, humidity and age. Furthermore, the estimation of power consumption is not limited to using the maps 66. For example, a relationship between parameters and power consumption may be defined in an alternative form such as a mathematical expression or the like, and this mathematical expression or the like may be used for estimating the power consumption.

Figure 6:
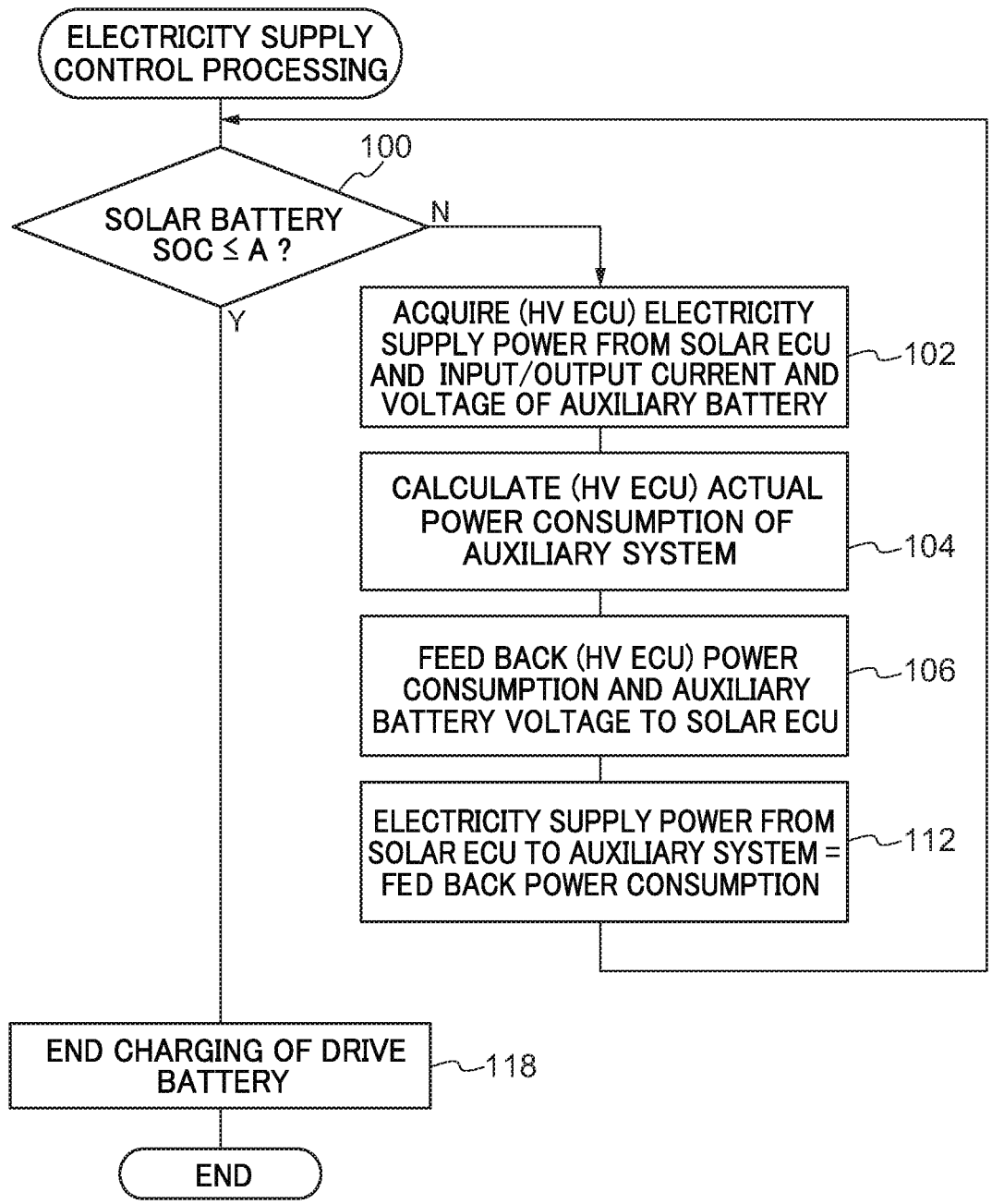
FIG. 6 is a flowchart illustrating electricity supply control processing according to the first exemplary embodiment.
Figure 11:
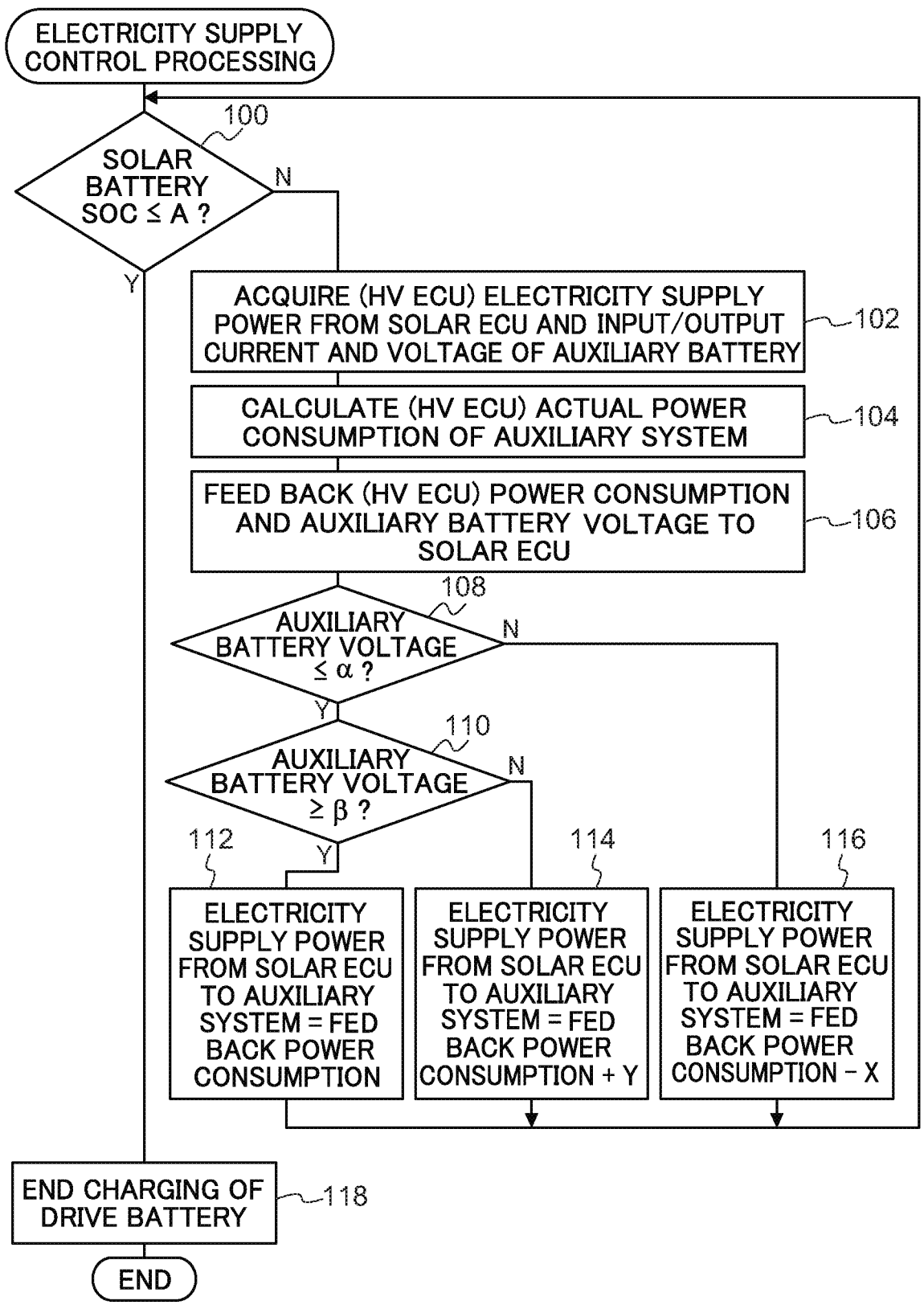
FIG. 11 is a flowchart illustrating electricity supply control processing according to a second exemplary embodiment.

The fixed constants X and Y illustrated in FIG. 6, FIG. 11 and FIG. 12 are not limited to being fixed values. For example, the values may be changed in accordance with the voltage of the auxiliary battery 20.

What is claimed is:
1. A vehicle electricity supply control system, comprising:
an acquisition section configured to acquire a power consumption of an auxiliary system, the auxiliary system being supplied with electricity from an auxiliary battery; and
a control section configured to, in a first supply mode in which electricity is supplied to a drive battery and the auxiliary system and in a case in which the power consumption of the auxiliary system is greater than a predetermined value, control a ratio of electricity supplied to the drive battery and the auxiliary system such that an electricity supply amount to the auxiliary system becomes greater than in a case in which the power consumption of the auxiliary system is less than the predetermined value,
wherein the acquisition section estimates the power consumption of the auxiliary system on the basis of at least one of a temperature, a humidity and an age of the auxiliary system.

2. The vehicle electricity supply control system according to claim 1 wherein, in the first supply mode, the supply of electricity to the drive battery and the auxiliary system uses electricity generated by a solar panel.

3. The vehicle electricity supply control system according to claim 2 wherein, in a second supply mode, electricity generated by the solar panel is supplied to a solar battery, and in the first supply mode, electricity is supplied from the solar battery to the drive battery and the auxiliary system.

4. The vehicle electricity supply control system according to claim 1, wherein, in a case in which a voltage of the auxiliary battery is not higher than an upper limit threshold α and not lower than a lower limit threshold β, the control section causes electricity supplied to the auxiliary system to be the power consumed by the auxiliary system.

5. The vehicle electricity supply control system according to claim 1, wherein, in a case in which a voltage of the auxiliary battery is higher than an upper limit threshold α, the control section causes electricity to be supplied to the auxiliary system in an amount that is the power consumed by the auxiliary system minus a predetermined value X.

6. The vehicle electricity supply control system according to claim 1, wherein, in a case in which a voltage of the auxiliary battery is lower than a lower limit threshold β, the control section causes electricity to be supplied to the auxiliary system in an amount that is the power consumed by the auxiliary system plus a predetermined value Y.

* * * * *